United States Patent
Deguchi

(10) Patent No.: US 9,821,384 B2
(45) Date of Patent: Nov. 21, 2017

(54) CUTTING INSERT, CUTTING TOOL AND METHOD FOR MANUFACTURING CUT PRODUCT

(71) Applicant: KYOCERA Corporation, Kyoto-shi, Kyoto (JP)

(72) Inventor: Shin Deguchi, Moriyama (JP)

(73) Assignee: KYOCERA Corporation, Kyoto (JP)

( * ) Notice: Subject to any disclaimer, the term of this patent is extended or adjusted under 35 U.S.C. 154(b) by 224 days.

(21) Appl. No.: 14/786,119

(22) PCT Filed: Apr. 23, 2014

(86) PCT No.: PCT/JP2014/061402
§ 371 (c)(1),
(2) Date: Oct. 21, 2015

(87) PCT Pub. No.: WO2014/175322
PCT Pub. Date: Oct. 30, 2014

(65) Prior Publication Data
US 2016/0067797 A1    Mar. 10, 2016

(30) Foreign Application Priority Data

Apr. 27, 2013 (JP) .................................. 2013-094806
Jun. 17, 2013 (JP) .................................. 2013-126492

(51) Int. Cl.
*B23C 5/20* (2006.01)
*B23C 5/10* (2006.01)

(52) U.S. Cl.
CPC .............. *B23C 5/207* (2013.01); *B23C 5/109* (2013.01); *B23C 5/202* (2013.01);
(Continued)

(58) Field of Classification Search
CPC .......... B23C 2210/084; B23C 2210/04; B23C 2210/045; B23C 2200/08;
(Continued)

(56) References Cited

U.S. PATENT DOCUMENTS

| | | | |
|---|---|---|---|
| 8,328,472 B2 * | 12/2012 | Choi | ........................ B23C 5/06 407/113 |
| 2004/0037659 A1 * | 2/2004 | Sung | ....................... B23C 5/202 407/114 |

(Continued)

FOREIGN PATENT DOCUMENTS

| JP | 09-225724 A | 9/1997 |
|---|---|---|
| JP | 11347826 A | * 12/1999 |

(Continued)

OTHER PUBLICATIONS

Office Action dated Jun. 21, 2016 issued by Japanese Patent Office for counterpart Japanese Application No. 2015-513793.

(Continued)

*Primary Examiner* — Daniel Howell
*Assistant Examiner* — Nicole N Ramos
(74) *Attorney, Agent, or Firm* — Procopio Cory Hargreaves and Savitch LLP

(57) ABSTRACT

A cutting insert includes an end cutting edge, a first major cutting edge, and a second major cutting edge. The height of the end cutting edge relative to an imaginary plane orthogonal to a central axis of a through-hole is fixed. The height of the first major cutting edge relative to the imaginary plane increases, when viewed from a side, moving away from the end cutting edge. The height of the second major cutting edge relative to the imaginary plane decreases, when viewed from a side, moving away from the first major cutting edge. When viewed from a side, the angle of inclination, relative to the imaginary plane, of an imaginary line connecting both ends of the second major cutting edge is greater than an angle of inclination, relative to the imaginary plane, of an imaginary line connecting both ends of the first major cutting edge.

9 Claims, 17 Drawing Sheets

(52) U.S. Cl.
CPC .. *B23C 2200/045* (2013.01); *B23C 2200/087* (2013.01); *B23C 2200/125* (2013.01); *B23C 2200/205* (2013.01); *B23C 2210/084* (2013.01); *Y10T 407/1964* (2015.01); *Y10T 407/23* (2015.01)

(58) Field of Classification Search
CPC ........ B23C 2200/083; B23C 2200/085; B23C 2200/12; B23C 2200/125; B23C 2200/20; B23C 2200/203; B23C 2200/28; B23C 2200/286; B23B 27/16; B23B 27/1611; Y10T 407/1924; Y10T 407/1942; Y10T 407/1946; Y10T 407/1956; Y10T 407/1962; Y10T 407/1964; Y10T 407/1936; Y10T 407/23
See application file for complete search history.

(56) References Cited

U.S. PATENT DOCUMENTS

| | | | | |
|---|---|---|---|---|
| 2008/0304924 A1* | 12/2008 | Engstrom | ............... | B23C 5/202 407/114 |
| 2010/0028092 A1* | 2/2010 | Choi | ........................ | B23C 5/202 407/40 |
| 2010/0111619 A1* | 5/2010 | Ballas | .................... | B23C 5/2213 407/40 |
| 2010/0150671 A1* | 6/2010 | Oprasic | ................... | B23C 5/207 407/42 |
| 2010/0202839 A1* | 8/2010 | Fang | ...................... | B23C 5/109 407/53 |
| 2012/0093596 A1* | 4/2012 | Ishi | ........................... | B23C 5/06 407/113 |
| 2012/0189396 A1* | 7/2012 | Xu | ........................... | B23C 5/06 409/132 |
| 2013/0302099 A1* | 11/2013 | Choi | ......................... | B23C 5/08 407/113 |
| 2014/0030034 A1* | 1/2014 | Lehto | ........................ | B23C 5/06 407/40 |
| 2014/0178135 A1* | 6/2014 | Yamamoto | ............. | B23C 5/109 407/42 |

FOREIGN PATENT DOCUMENTS

| | | |
|---|---|---|
| JP | 2008-254129 A | 10/2008 |
| JP | 2009-208172 A | 9/2009 |
| WO | 2011/024595 A1 | 3/2011 |

OTHER PUBLICATIONS

International Search Report (Form PCT/ISA/210) dated Jul. 22, 2014 and issued for International Patent Application No. PCT/JP2014/061402.

* cited by examiner

CUTTING INSERT, CUTTING TOOL AND METHOD FOR MANUFACTURING CUT PRODUCT

TECHNICAL FIELD

The present invention relates to a cutting insert, a cutting tool, and a method for manufacturing a cut product.

BACKGROUND

Japanese Unexamined Patent Application Publication No. H9-225724 (Patent Document 1) discloses an example of a conventional tip that can be used as a cutting insert in a process for machining a workpiece. The tip disclosed in Patent Document 1 includes a plurality of cutting edges that have a circular arc shape when viewed from the side and have a curved shape that protrudes outwards when viewed from directly above. With this cutting edge configuration, when the cutting edge is brought into contact with the workpiece, the portion of the cutting edge that has the greatest height contacts the workpiece first, and shorter portions of the cutting edge contact the workpiece gradually. This makes it possible to reduce the impact force on the tip.

As illustrated in FIGS. 16 and 17, when a cutting edge 309 has a curved shape that protrudes outwards when viewed from directly above like the circular arc-shaped cutting edge disclosed in Patent Document 1, the thickness R1 of chips cut from a workpiece 201 by a region of the cutting edge near an end portion that contacts the bottom machining surface 201a of the workpiece 201 (hereinafter, referred to as a first region 309a) is less than the thickness R2 of chips cut from the workpiece 201 by a region of the cutting edge farther away from the end portion (hereinafter, referred to as a second region 309b). Therefore, a relatively large force is applied to the second region 309b.

Meanwhile, in the tip disclosed in Patent Document 1, the cutting edge 309 has a circular arc shape and is therefore bilaterally symmetric about the center of the cutting edge, which has the greatest height. As a result, even if the first region 309a cuts the workpiece 201 in a satisfactory manner, the inclination of the cutting edge 309 is insufficient in the second region 309b. This makes it more difficult for the second region 309b to cut the workpiece 201 in a satisfactory manner.

The present invention was made in view of the above-mentioned problems and aims to provide a cutting insert having satisfactory cutting ability even when the cutting edge has a curved shaped that protrudes outwards when viewed from directly above, as well as a cutting tool and a method for manufacturing a cut product.

SUMMARY OF THE INVENTION

One aspect of the present invention is a cutting insert, including: a top surface; a bottom surface; a side surface disposed between the top surface and the bottom surface; a cutting edge formed along an edge where the top surface and the side surface meet; and a through-hole formed from a center portion of the top surface through a center portion of the bottom surface. The cutting edge includes, in order, an end cutting edge, a first major cutting edge and a second major cutting edge.

The height of the end cutting edge relative to an imaginary plane orthogonal to a central axis of the through-hole is fixed. The first major cutting edge has a curved shape that protrudes outwards when viewed from directly above, and the height of the first major cutting edge relative to the imaginary plane increases, when viewed from a side, moving away from the end of the first major cutting edge connected to the end cutting edge. The second major cutting edge has a curved shape that protrudes outwards when viewed from directly above, and the height of the second major cutting edge relative to the imaginary plane decreases, when viewed from a side, moving away from the end of the second major cutting edge connected to the first major cutting edge. When viewed from the side, the angle of inclination of the second major cutting edge relative to the imaginary plane is greater at the center of the second major cutting edge than at either end thereof. Moreover, when viewed from a side, the angle of inclination, relative to the imaginary plane, of an imaginary line connecting both ends of the second major cutting edge is greater than the angle of inclination, relative to the imaginary plane, of an imaginary line connecting both ends of the first major cutting edge.

DETAILED DESCRIPTION OF THE INVENTION

Figure 1:
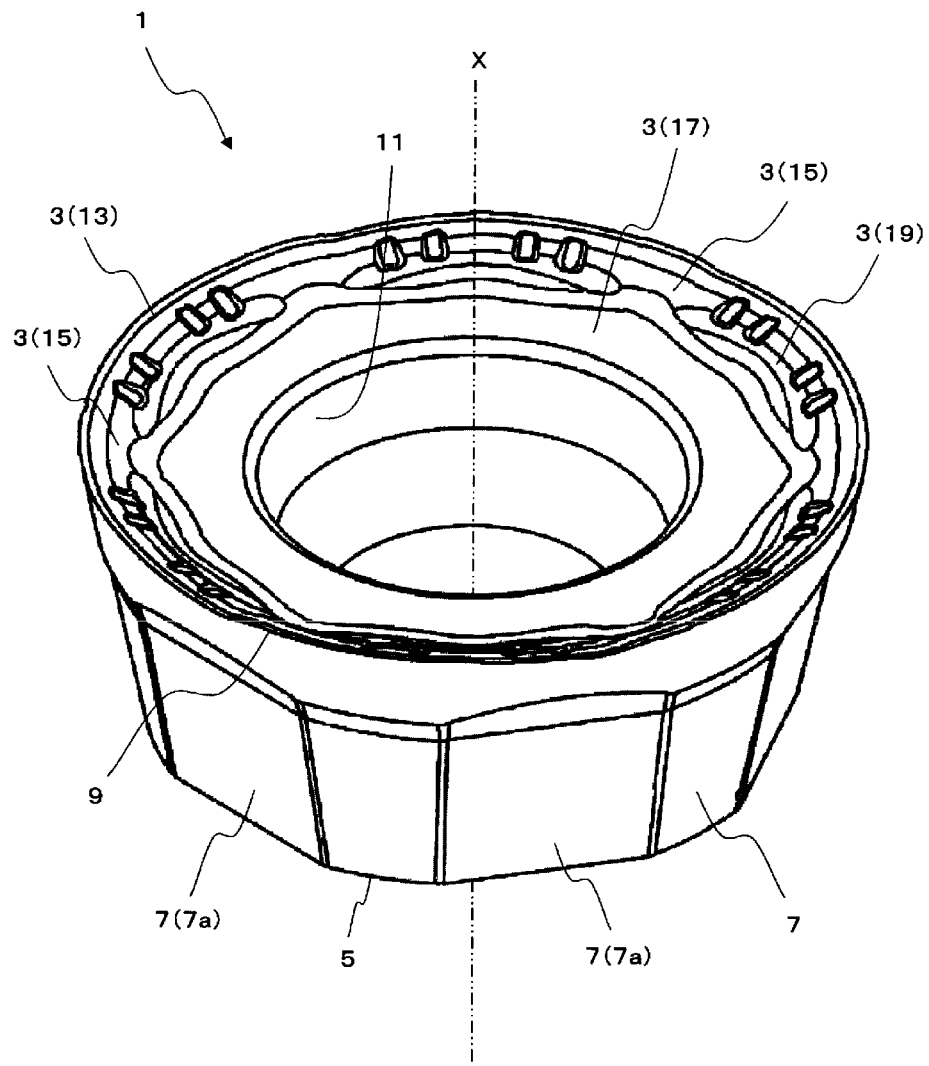
FIG. 1 is a perspective view of a cutting insert according to an embodiment of the present invention.
Figure 2:
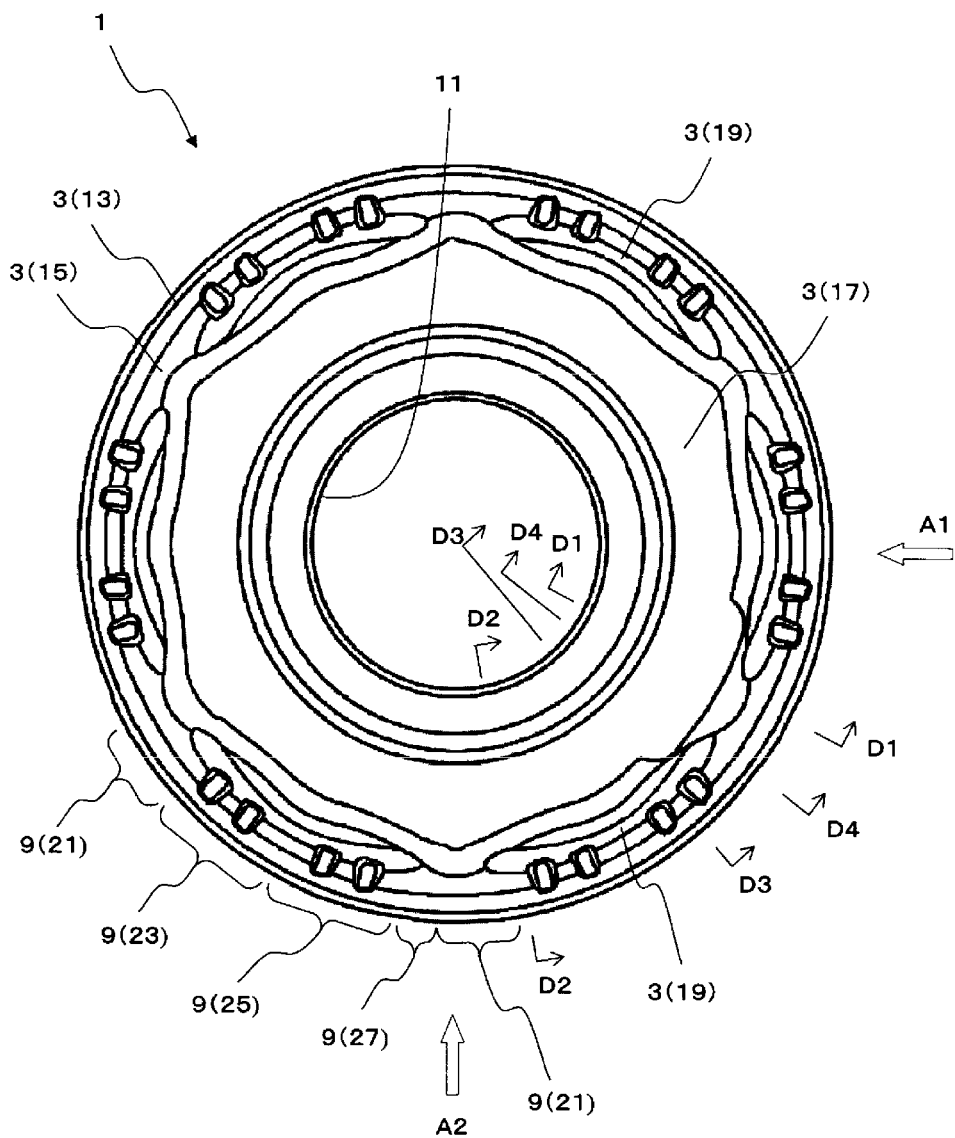
FIG. 2 is a top view of the cutting insert illustrated in FIG. 1.
Figure 3:
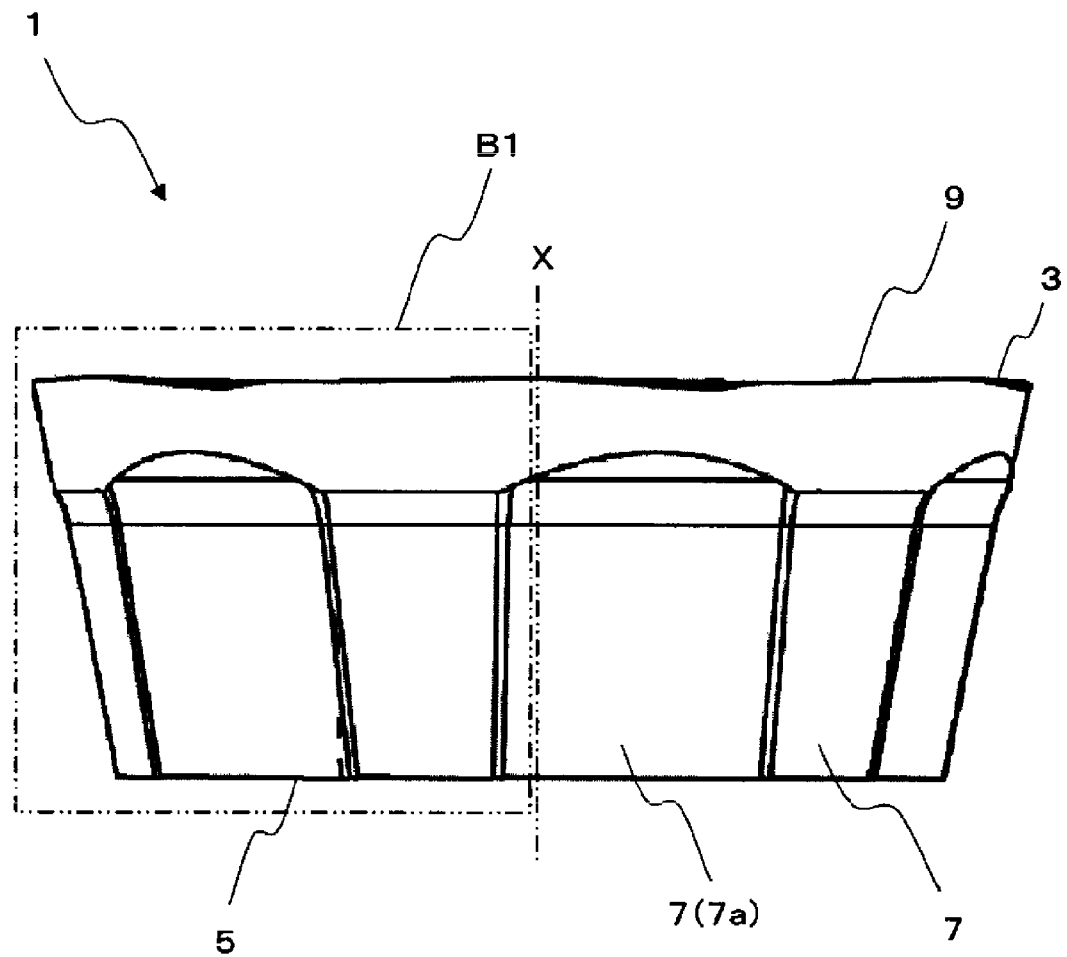
FIG. 3 is a side view of the cutting insert illustrated in FIG. 2 from direction A1.

A cutting insert according to an embodiment of the present invention will be described in detail below with reference to figures. Note that for the sake of simplicity, the figures referenced below are simplified drawings illustrating only the primary components of the embodiment needed to fully describe the present invention. Therefore, the present cutting insert may also include various other components not depicted in the figures in the present specification. Furthermore, the dimensions of the components as depicted in the figures do not necessarily represent the actual dimensions of those components or the actual dimensional proportions between those components.

As illustrated in FIGS. 1 to 10, a cutting insert 1 according to the present embodiment includes a top surface 3, a bottom surface 5, and a side surface 7. The bottom surface 5 is disposed opposite to the top surface 3. The side surface 7 is disposed between the top surface 3 and the bottom surface 5 so as to connect the top surface 3 and the bottom surface 5. A cutting edge 9 is formed along the edge where the top surface 3 and the side surface 7 meet. In the cutting insert 1 according to the present embodiment, a central axis X passes through the center of the bottom surface 5 and the center of the top surface 3.

The cutting insert 1 also has a through-hole 11 that is formed going from the center portion of the top surface 3 to the center portion of the bottom surface 5 and that creates openings in the centers of the top surface 3 and the bottom surface 5. The through-hole 11 surrounds the central axis X, and the through direction of the through-hole 11 is parallel to the central axis X. The through-hole 11 is formed so that a fixing screw can be inserted therethrough in order to fix the cutting insert 1 to the holder of a cutting tool.

The top surface 3 and the bottom surface 5 are both substantially circular when viewed from directly above, and both have approximately the same shape. The bottom surface 5 is smaller than the top surface 3. As a result, when viewed from the side, the side surface 7 slopes inwards towards the central axis X going from the portion that connects to the top surface 3 to the portion that connects to the bottom surface 5.

The maximum width for the top surface 3 and the bottom surface 5 in the cutting insert 1 of the present embodiment is from 5 to 20 mm. Moreover, the height from the bottom surface 5 to the top surface 3 is from 2 to 8 mm. Here, the maximum width of the top surface 3 refers to the maximum value of the width of the top surface 3 when viewed from directly above. Similarly, the maximum width of the bottom surface 5 refers to the maximum value of the width of the bottom surface 5 when viewed from directly below. Moreover, the height from the bottom surface 5 to the top surface 3 refers to the magnitude of the dimension that runs parallel to the central axis X between the top end of the top surface 3 and the bottom end of the bottom surface 5.

Note that the shapes used for the top surface 3 and the bottom surface 5 are not limited to the shapes described above. Although the top surface 3 is substantially circular, the curved portions that run around the periphery of the top surface 3 are not limited to smooth circular arcs, for example. These curved portions may be parabola-shaped or elliptic curve-shaped, for example, and protrude outwards.

Examples of materials for the cutting insert 1 include cemented carbide alloys and cermets, for example. Examples of cemented carbide alloys include, WC—Co alloys in which cobalt (Co) powder is added to tungsten carbide (WC) and the resulting mixture is sintered; WC—TiC—Co alloys in which titanium carbide (TiC) is added to WC—Co; and WC—TiC—TaC—Co alloys in which tantalum carbide (TaC) is added to WC—TiC—Co. Moreover, specific examples of cermet (sintered composite materials composed of ceramic and metal materials) include titanium compounds in which titanium carbide (TiC) or titanium nitride (TiN) is the main ingredient.

The surface of the cutting insert 1 may be coated with a film using a chemical vapor deposition (CVD) or physical vapor deposition (PVD) method. Examples of compositions for this film include titanium carbide (TiC), titanium nitride (TiN), titanium carbonitride (TiCN), and alumina ($Al_2O_3$).

As illustrated in FIG. 2 and FIGS. 7 to 10, the top surface 3 includes a land face 13, a rake face 15, and a bottom face 17. The land face 13 is formed along the cutting edge 9. In other words, the land face 13 runs around the periphery of the top surface 3 and is connected to the cutting edge 9. The land face 13 is substantially parallel to the bottom surface or sloped downwards moving towards the center of the cutting insert 1. The land face 13 may also be sloped upwards moving towards the center of the cutting insert 1.

Here, "substantially parallel" does not mean that the two surfaces must be exactly parallel and includes cases in which the surfaces are misaligned by about ±1°. If the bottom surface is not planar and it is difficult to evaluate whether the land face 13 is parallel thereto, the inclination of the land face 13 may be compared to the central axis X instead of to the bottom surface. In other words, whether the land face 13 is orthogonal to the central axis X may be evaluated.

The cutting edge 9 is formed along the edge where the land face 13 and the side surface 7 meet. The land face 13 is formed to increase the strength of the cutting edge 9. If no land face 13 is included, the cutting edge 9 is formed along the edge where the rake face 15 and the side surface 7 meet. The rake face 15 is positioned on the inner side of the land face 13 and is surrounded thereby. The rake face 15 is sloped downwards towards the bottom surface 5 moving towards the center of the cutting insert 1. The angle of inclination of the rake face 15 is larger than the angle of inclination of the land face 13.

In other words, the strength of the cutting edge 9 can be increased by including the land face 13 and making the angle of inclination of the land face 13 smaller than the angle of inclination of the rake face 15. Note that the "angle of inclination" of the rake face 15 and the land face 13 refers to the angle between each face and a line orthogonal to the central axis X in the cross section including the central axis X. The width of the land face 13 that is disposed between the outer periphery of the top surface 3 and the outer periphery of the rake face 15 may be set as appropriate on the basis of the cutting conditions. The width of the land face 13 may be set to a value in the range of 0.01 to 1 mm, for example.

The edge where the top surface 3 and the side surface 7 meet and along which the cutting edge 9 is formed is not a perfectly straight line of the type that would be formed where two perfectly flat planes intersect. If the edge where the top surface 3 and the side surface 7 meet includes any acute angles, the durability of the cutting edge 9 decreases. Therefore, a so-called honing process may be performed around the portion where the top surface 3 and the side surface 7 meet in order to form a slight curved surface.

The rake face 15 is positioned on the inner side of the land face 13. The rake face 15 rakes away cut chips from the cutting edge 9. As a result, chips cut from the workpiece slide over the surface of the rake face 15. The rake face 15 is sloped downwards towards the bottom surface 5 moving away from the land face 13 so that the rake face 15 can satisfactorily rake away chips. In other words, in the cutting insert 1 of the present embodiment, the rake face 15 is sloped downwards moving towards the center of the top surface 3.

Grooves 19 are formed in the rake face 15. When the cutting process is performed using a coolant, these grooves 19 provide locations where the coolant can easily pool. This enhances cooling of the cutting edge 9.

The bottom face 17 is positioned on the inner side of the rake face 15. In the cutting insert 1 of the present embodiment, the bottom face 17 is a planar face perpendicular to the central axis X. An opening of the through-hole 11 is located at the center of the bottom face 17. In the present embodiment, the top surface 3 includes the land face 13, the rake face 15, and the bottom face 17. However, the top surface 3 is not limited to these configurations. For example, the top surface 3 may also include a breaker face that slopes upwards away from the bottom surface 5 moving away from the land face 13 and that is arranged on the inner side of the bottom face 17.

The cutting edge 9 is formed along the edge where the top surface 3 and the side surface 7 meet. The cutting edge 9 includes, in order, an end cutting edge 21, a first major cutting edge 23, a second major cutting edge 25, and a minor cutting edge 27. The cutting insert 1 of the present embodiment includes six cutting edge groups, each including an end cutting edge 21, a first major cutting edge 23, a second major cutting edge 25, and a minor cutting edge 27. In adjacent cutting edge groups, the minor cutting edge 27 of one cutting edge group is adjacent to the end cutting edge 21 of the next cutting edge group. Therefore, when viewed from directly above, the cutting edge groups are rotationally symmetric about the central axis X, each spanning 60°. Each end cutting edge 21, first major cutting edge 23, second major cutting edge 25, and minor cutting edge 27 is smoothly connected to the adjacent cutting edge.

A cutting process can be performed using a single one of these cutting edge groups. When one of the cutting edge groups wears out after a long cutting process, another one of the plurality of cutting edge groups may be used. In other words, the cutting insert 1 can be temporarily removed from the holder, rotated 60°, for example, around the central axis X, and reattached to the holder. In this way, one of the adjacent cutting edge groups can be used to start a new cutting process on the workpiece.

Figure 7:
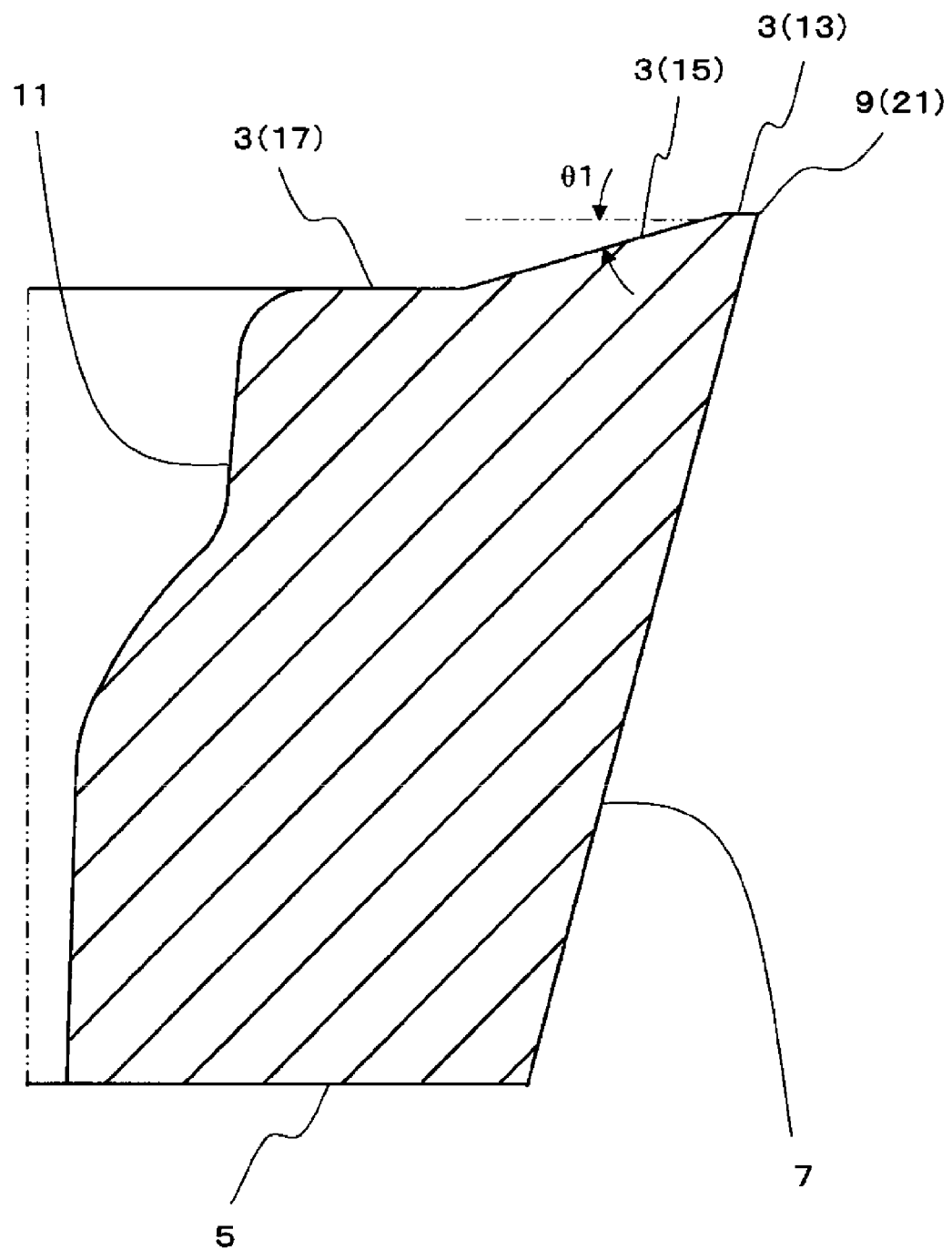
FIG. 7 is a cross-sectional view of a cross section taken along line D1-D1 in the cutting insert illustrated in FIG. 2.
Figure 8:
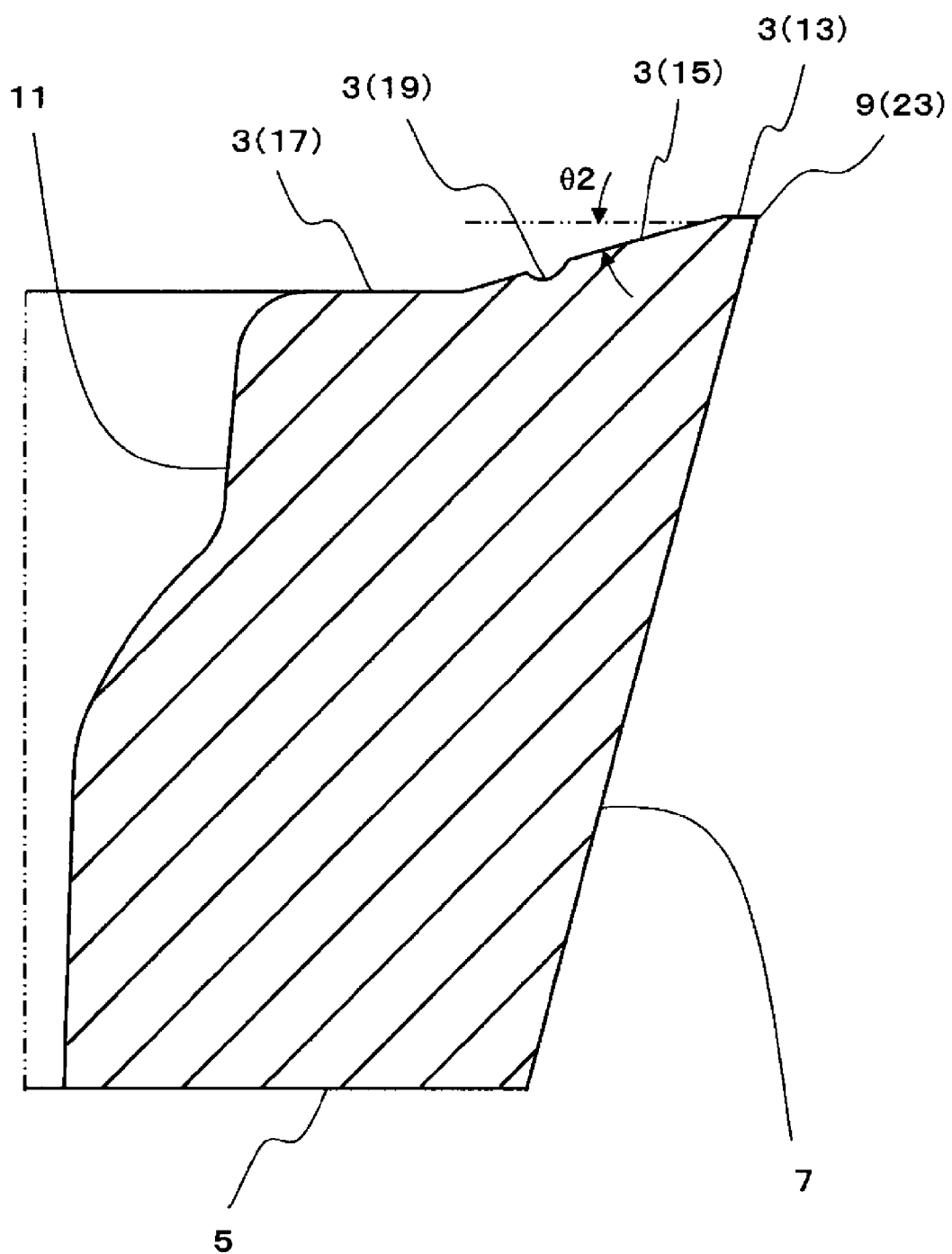
FIG. 8 is a cross-sectional view of a cross section taken along line D2-D2 in the cutting insert illustrated in FIG. 2.
Figure 9:
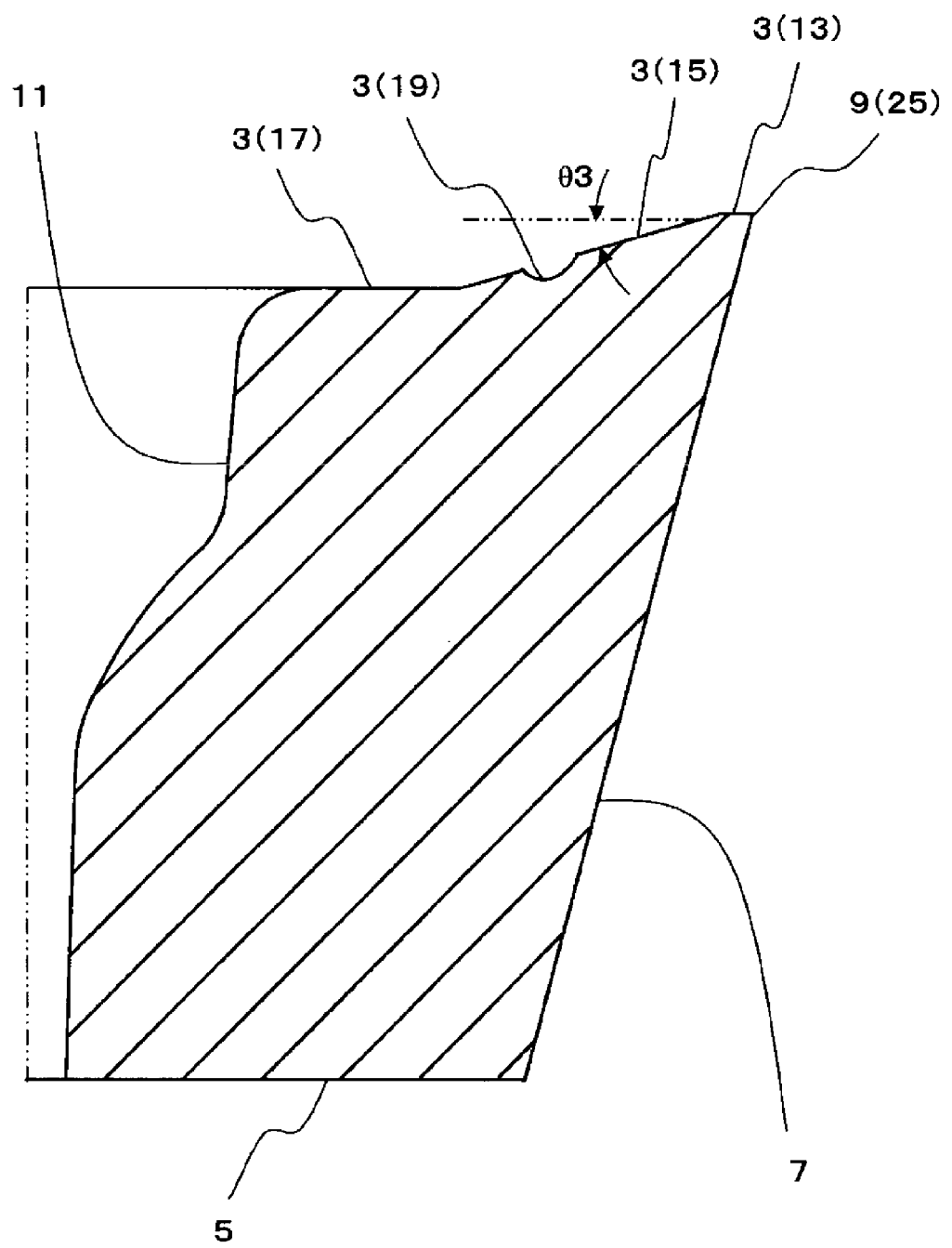
FIG. 9 is a cross-sectional view of a cross section taken along line D3-D3 in the cutting insert illustrated in FIG. 2.
Figure 10:
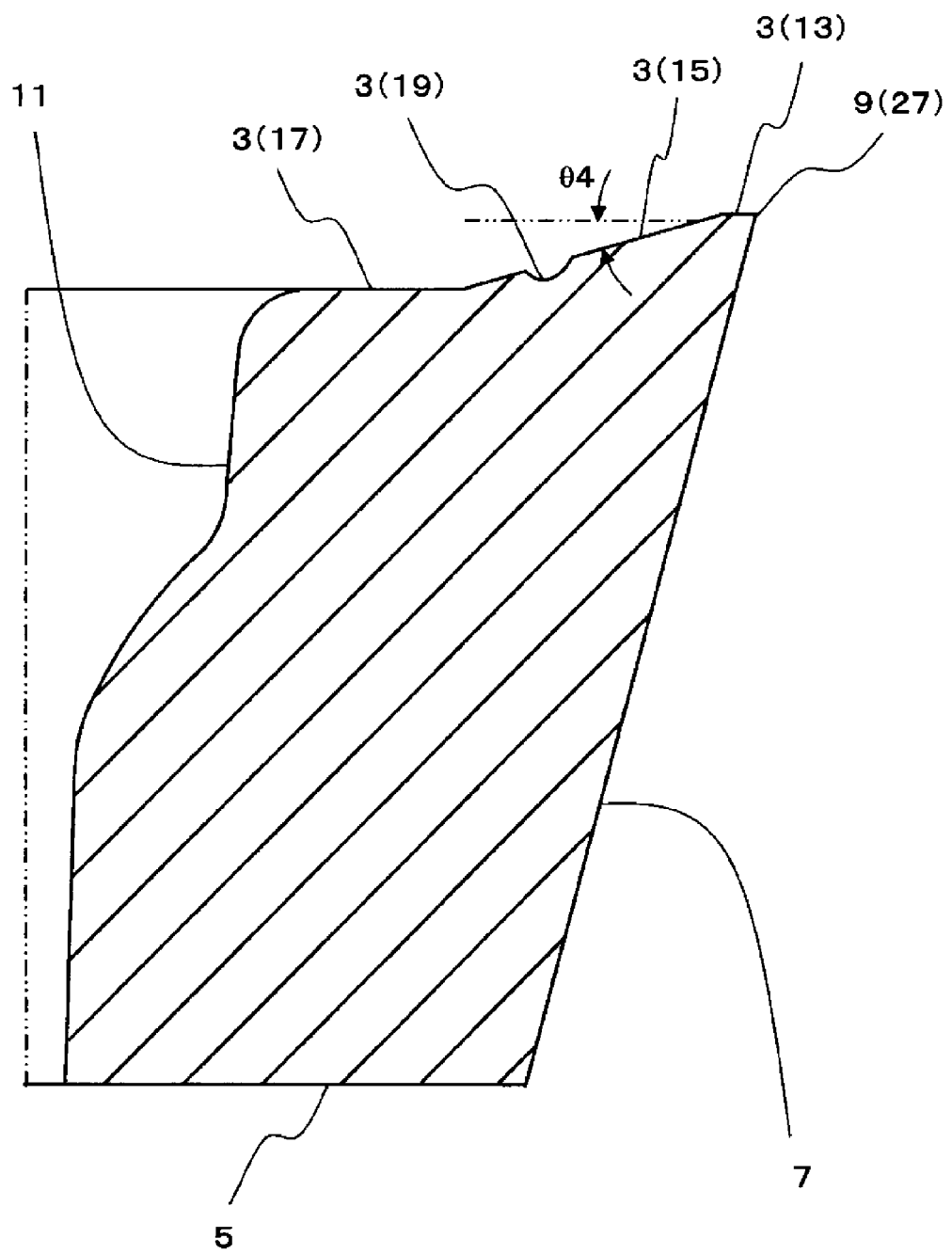
FIG. 10 is a cross-sectional view of a cross section taken along line D4-D4 in the cutting insert illustrated in FIG. 2.

The rake angles of the rake face 15 are set such that the rake angles $\theta 1$ to $\theta 4$ are equal. As illustrated in FIG. 7, the rake angle $\theta 1$ is the rake angle of the region corresponding to the end cutting edge 21. As illustrated in FIG. 8, the rake angle $\theta 2$ is the rake angle of the region corresponding to the first major cutting edge 23. As illustrated in FIG. 9, the rake angle $\theta 3$ is the rake angle of the region corresponding to the second major cutting edge 25. As illustrated in FIG. 10, the rake angle $\theta 4$ is the rake angle of the region corresponding to the minor cutting edge 27.

Note that FIG. 7 is a cross-sectional view of a cross section that includes the central axis X and intersects with the end cutting edge 21. FIG. 8 is a cross-sectional view of a cross section that includes the central axis X and intersects with the first major cutting edge 23. FIG. 9 is a cross-sectional view of a cross section that includes the central axis X and intersects with the second major cutting edge 25. FIG. 10 is a cross-sectional view of a cross section that includes the central axis X and intersects with the minor cutting edge 27.

The cutting insert 1 of the present embodiment includes six cutting edge groups; however, the present embodiment is not limited only to such configurations. For example, the cutting insert 1 may include four cutting edge groups, which when viewed from directly above are rotationally symmetric about the central axis X, each spanning 90°. Moreover, the cutting insert 1 may include eight cutting edge groups, which when viewed from directly above are rotationally symmetric about the central axis X, each spanning 45°.

The end cutting edge 21 contacts the bottom machining surface of the workpiece and cuts therealong. During the cutting process, the end cutting edge 21 is the lowermost portion of the cutting tool. Therefore, the end cutting edge 21 is positioned furthest away from the end of the holder when the cutting insert 1 is attached thereto. The end cutting edge 21 is used so as to contact the bottom machining surface of the workpiece, and therefore the height of the end cutting edge 21 relative to an imaginary plane L orthogonal to the central axis X running through the through-hole 11 is fixed. The end cutting edge 21 is positioned so as to contact the bottom machining surface of the workpiece and can therefore also be used as a flat cutting edge.

The first major cutting edge 23 is adjacent to the end cutting edge 21 and has a curved shape that protrudes outwards when viewed from directly above. When viewed from the side, the height of the first major cutting edge 23 relative to the imaginary plane L increases moving away from the end of the first major cutting edge 23 that is connected to the end cutting edge 21. The chips cut from the workpiece are thicker in the regions cut by the first major cutting edge 23 than in the regions cut by the end cutting edge 21.

When the cutting insert 1 of the present embodiment is viewed from the side, the height of the end cutting edge 21 relative to the imaginary plane L is fixed, while the height of the first major cutting edge 23 relative to the imaginary plane L increases moving away from the end of the first major cutting edge 23 that is connected to the end cutting edge 21. The chips produced during the cutting process are relatively thin in the regions thereof cut by the first major cutting edge 23, and the gentle slope of the first major cutting edge 23 reduces rapid increases in cutting resistance.

Like the first major cutting edge 23, the second major cutting edge 25 has a curved shape that protrudes outwards when viewed from directly above. The second major cutting edge 25 is adjacent to the first major cutting edge 23 and is separated thereby from the end cutting edge 21. Furthermore, when viewed from the side, the height of the second major cutting edge 25 relative to the imaginary plane L decreases moving away from the end of the second major cutting edge 25 that is connected to the first major cutting edge 23.

As with the first major cutting edge 23, the chips cut from the workpiece are thicker in the regions cut by the second major cutting edge 25 than in the regions cut by the end cutting edge 21. Therefore, a greater force is easy to apply to the second major cutting edge 25 than to the end cutting edge 21. However, the height of the second major cutting edge 25 relative to the imaginary plane L is not fixed, and the second major cutting edge 25 is sloped. Therefore, the cutting resistance on the second major cutting edge 25 during the cutting process can be reduced.

The chips cut from workpiece are even thicker in regions cut by the second major cutting edge 25 than in regions cut by the first major cutting edge 23. However, in the cutting insert 1 of the present embodiment, when viewed from the side, the angle of inclination of the second major cutting edge 25 relative to the imaginary plane L is larger at the center of the second major cutting edge 25 than at either end thereof. Moreover, the angle of inclination $\theta 5$ of an imaginary line connecting both ends of the second major cutting edge 25 relative to the imaginary plane L is larger than the angle of inclination θ6 of an imaginary line connecting both ends of the first major cutting edge 23 relative to the imaginary plane L.

The first major cutting edge 23 slopes gently upwards away from the imaginary plane L moving away from the end cutting edge 21. The second major cutting edge 25 slopes rapidly downwards towards the imaginary plane L moving away from the first major cutting edge 23. Therefore, the cutting resistance on the second major cutting edge 25 may be even smaller than the cutting resistance on the first major cutting edge 23 during the cutting process. The angle of inclination θ5 of the second major cutting edge 25 (which is positioned in the region where the chips become relatively thick) relative to the imaginary plane L is relatively large, and therefore the workpiece can be cut in a stable manner.

Note that the angle of inclination of the second major cutting edge 25 relative to the imaginary plane L is larger at the center of the second major cutting edge 25 than at either end thereof because the second major cutting edge 25 is smoothly connected to the first major cutting edge 23 and the minor cutting edge 27. Here, the "center" of the second major cutting edge 25 refers to the portion positioned between the ends of the second major cutting edge 25. However, the manner in which the angle of inclination of the second major cutting edge 25 is configured relative to the imaginary plane L is not particularly limited.

Figure 11A:
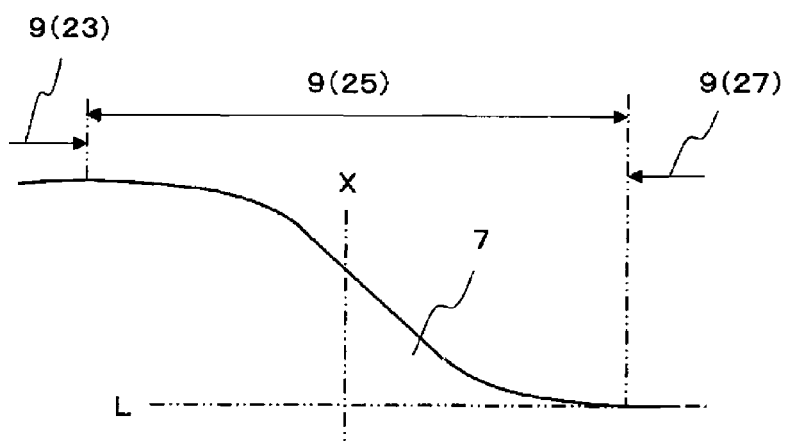
FIG. 11A is an enlarged side view of a second major cutting edge of the cutting insert illustrated in FIG. 5.
Figure 11B:
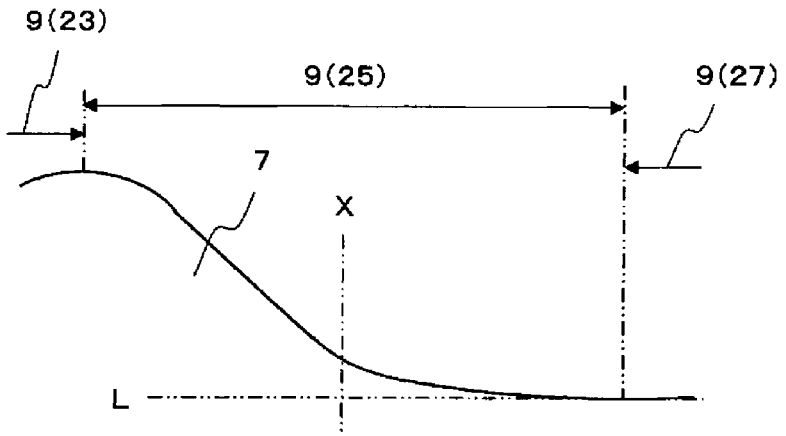
FIG. 11B is a side view of modification example 1 of the cutting insert illustrated in FIG. 11A.
Figure 11C:
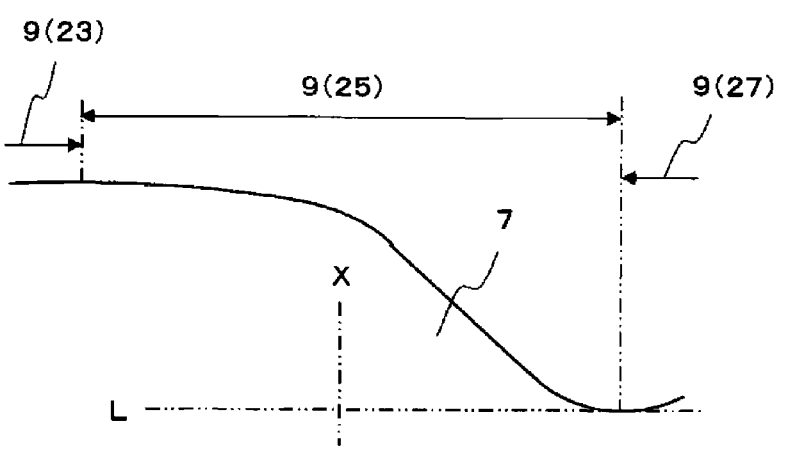
FIG. 11C is a side view of modification example 2 of the cutting insert illustrated in FIG. 11A.

For example, as illustrated in FIG. 11A, when viewed from the side, the center of the second major cutting edge 25 in a direction perpendicular to the central axis X may have a large angle of inclination relative to the imaginary plane L. Alternatively, as illustrated in FIG. 11B, a portion of the second major cutting edge 25 that is closer, when viewed from the side, to the first major cutting edge 23 than is the center of the second major cutting edge 25 in the direction perpendicular to the central axis X may have a large angle of inclination relative to the imaginary plane L. Or, as illustrated in FIG. 11C, a portion of the second major cutting edge 25 that is closer, when viewed from the side, to the minor cutting edge 27 than is the center of the second major cutting edge 25 in the direction perpendicular to the central axis X may have a large angle of inclination relative to the imaginary plane L. Note that in each drawing in FIGS. 11A to 11C, the dimensions of the second major cutting edge 25 in the direction parallel to the central axis X are exaggerated in order to make the inclination of the second major cutting edge 25 easier to see.

The height of the first major cutting edge 23 relative to the imaginary plane L increases moving away from one end of the first major cutting edge 23. The height of the second major cutting edge 25 relative to the imaginary plane L decreases moving away from one end of the second major cutting edge 25. If the height of the second major cutting edge 25 relative to the imaginary plane L instead increases moving away from that same end of the second major cutting edge 25, the durability of the cutting edge 9 may decrease. This is because this configuration results in too large a difference between the height of the other end of the second major cutting edge 25 relative to the imaginary plane L and the height of the end cutting edge 21 relative to the imaginary plane L.

The height of the other end of the second major cutting edge 25 is smaller than the height of the end cutting edge 21 relative to the imaginary plane L. This makes it possible to maintain a sufficiently large difference in height between the ends of the second major cutting edge 25, and therefore the length of the second major cutting edge 25 can be increased while still maintaining a relatively large angle of inclination. As a result, the second major cutting edge 25 can cut wide, relatively thick chips from the workpiece.

In the cutting insert 1 of the present embodiment, the top surface 3 and the bottom surface 5 are both substantially circular. Therefore, the side surface 7 has a curved, substantially cylindrical shape. The entire surface of the side surface 7 is not curved; the side surface 7 also includes planar regions 7a. These planar regions 7a are separated from the cutting edge 9 and positioned around the bottom surface 5 side of the side surface 7. Each planar region 7a is positioned below one of the second major cutting edges 25. The present embodiment has six second major cutting edges 25 and therefore has six planar regions 7a as well.

The planar regions 7a function as binding faces for fixing the cutting insert 1 to the holder. If the side surface 7 is perfectly cylindrical, the cutting insert 1 is prone to rotation about the central axis X when attached to the holder. This may make it difficult to stably fix the cutting insert 1 to the holder. However, the planar regions 7a contact the holder and make it difficult for the cutting insert 1 to rotate about the central axis X. This makes it possible to stably fix the cutting insert 1 to the holder.

The planar regions 7a are formed by removing portions of the originally cylindrical side surface 7 to form flat faces. Therefore, the durability of the portions of the cutting edge 9 above the planar regions 7a may be decreased.

However, in the cutting insert 1 of the present embodiment, the planar regions 7a are positioned primarily below the second major cutting edges 25. More specifically, when the cutting insert 1 is viewed directly from the side from the planar region 7a side, each planar region 7a is positioned such that an imaginary line that runs through the center of that planar region 7a and is parallel to the central axis X intersects with the respective second major cutting edge 25. As described above, the cutting resistance on the second major cutting edge 25 is smaller than the cutting resistance on the other portions of the cutting edge 9. Positioning the planar regions 7a below the second major cutting edges 25, where the cutting resistance is relatively small, reduces the possibility of damage to the cutting edge 9.

When the cutting insert 1 of the present embodiment is viewed from the side, the width of each planar region 7a in a direction orthogonal to the central axis X is larger than the width of each second major cutting edge 25 in the direction orthogonal to the central axis X. Furthermore, the entire second major cutting edge 25 is positioned above the respective planar region 7a. Therefore, any effects applied to one of the planar regions 7a during the cutting process can be reduced across the entire corresponding second major cutting edge 25.

Figure 4:
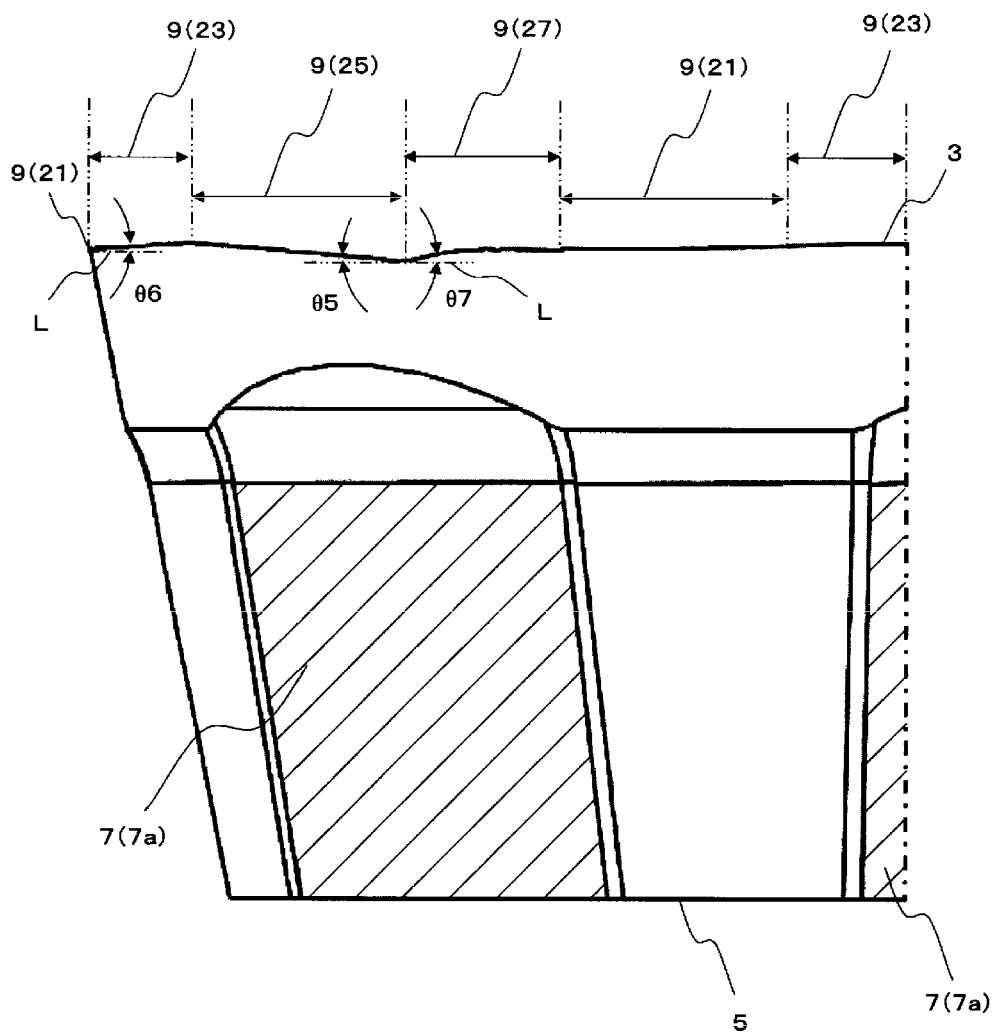
FIG. 4 is an enlarged side view of region B1 of the cutting insert illustrated in FIG. 3.

Note that in FIG. 4, hatching is added to the planar regions 7a to make the positions of those planar regions 7a more apparent.

Moreover, when the side surface 7 is slanted, as in the cutting insert 1 of the present embodiment, the difference between the distance of the end cutting edge 21 from the central axis X and the distance of the other end of the second major cutting edge 25 from the central axis X tends to be large. This large difference in distances makes the R-shape of the machining surface of the workpiece more prone to distortion. However, because the second major cutting edge 25 slopes downwards towards the bottom surface 5 moving away from one end of that second major cutting edge 25, large differences between the height of the second major cutting edge 25 at each end thereof relative to the imaginary plane L and the height of the end cutting edge 21 relative to the imaginary plane L can be prevented.

The cutting edge 9 includes, in order, the end cutting edge 21, the first major cutting edge 23, and the second major cutting edge 25, each configured as described above. Due to the presence of the end cutting edge 21 (which has a fixed height relative to the imaginary plane L), the angles of inclination of the first major cutting edge 23 and the second major cutting edge 25 can be made larger than in a configuration in which the cutting edge 9 includes only the first major cutting edge 23 and the second major cutting edge 25.

Moreover, due to the presence of the end cutting edge 21 (which is positioned to contact the bottom machining surface of the workpiece), the first major cutting edge 23 and the second major cutting edge 25 can be positioned farther away from the bottom machining surface of the workpiece than in the configuration in which the cutting edge 9 includes only the first major cutting edge 23 and the second major cutting edge 25. This facilitates moving the positions of the first major cutting edge 23 and the second major cutting edge 25, by an amount equal to the region where the end cutting edge 21 is positioned, to regions in which the workpiece is thicker and in which more cutting force is applied during the cutting process.

The chips cut from the workpiece are thinner in the regions cut by the end cutting edge 21 and the first major cutting edge 23 than in the regions cut by the second major cutting edge 25. Therefore, when the end cutting edge 21 and the first major cutting edge 23 first contact the workpiece, the resulting impact force on the cutting insert 1 is small. As a result, the effects of such impact forces on the cutting insert 1 of the present embodiment are minor, and the cutting insert 1 can stably cut the workpiece even in regions where the resulting chips are relatively thick.

In the description above, the term "angle of inclination" of each portion of the cutting edge 9 refers to the angle between an imaginary line that connects both ends of the portion of the cutting edge 9 in question and the imaginary plane L that is orthogonal to the central axis X of the through-hole 11 when that portion of the cutting edge 9 is viewed from the side from a direction orthogonal to a line tangent to that portion of the cutting edge 9 when viewed from directly above. More generally, the angle of inclination is the inclination of the portion of the cutting edge 9 in question when viewed from the side from a direction normal to that portion.

Figure 5:
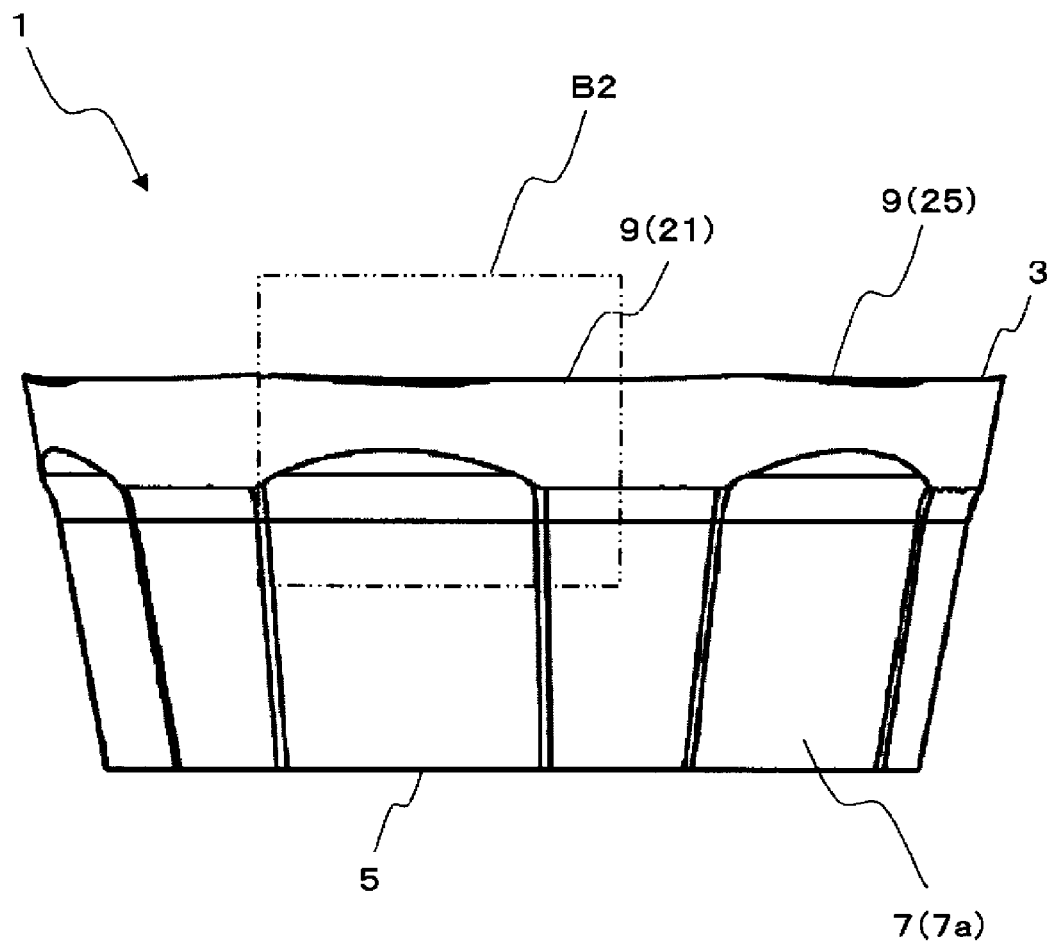
FIG. 5 is a side view of the cutting insert illustrated in FIG. 2 from direction A2.
Figure 6:
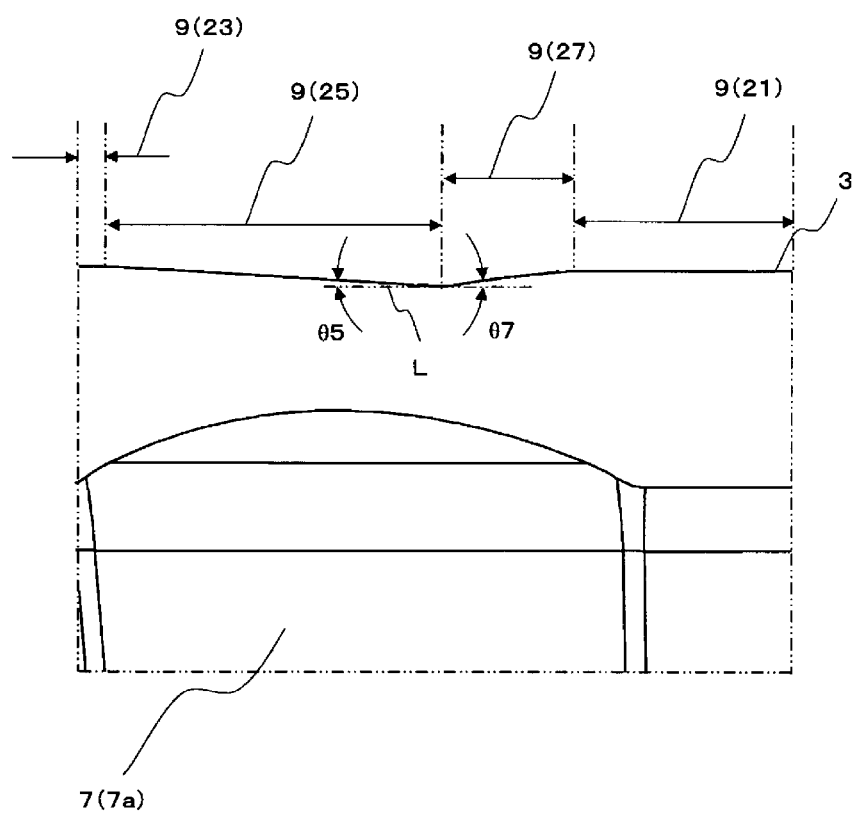
FIG. 6 is an enlarged side view of region B2 of the cutting insert illustrated in FIG. 5.

For example, FIGS. 5 and 6 are side views from a direction orthogonal to a line tangent to the end cutting edge 21. Here, the angle between an imaginary line that runs parallel to the center portion of the cutting edge 9 (that is, the end cutting edge 21) and the imaginary plane L that is orthogonal to the central axis of the through-hole is the angle of inclination of the end cutting edge 21. However, the end cutting edge 21 has a fixed height relative to the imaginary plane L, and therefore the angle of inclination of the end cutting edge 21 is 0°.

Moreover, under the definition provided above for angle of inclination, the angle of inclination $\theta 6$ of the first major cutting edge 23, the angle of inclination $\theta 5$ of the second major cutting edge 25, and the angle of inclination $\theta 7$ of the minor cutting edge 27 as illustrated in FIG. 4, for example, refer to angles of inclination $\theta 5$, $\theta 6$, and $\theta 7$. Note, however, that the actual values for each angle of inclination may be different than the angles depicted in FIG. 4. The values for the angle of inclination $\theta 6$ of the first major cutting edge 23 and the angle of inclination $\theta 5$ of the second major cutting edge 25 are not particularly limited. However, the angle of inclination $\theta 6$ of the first major cutting edge 23 may be set to a value in the range of 2.5 to 3.5°, and the angle of inclination $\theta 5$ of the second major cutting edge 23 may be set to a value in the range of 4 to 6°, for example.

The minor cutting edge 27 is connected to the second major cutting edge 25 and is disposed on the opposite side to the first major cutting edge 23. In other words, the minor cutting edge 27 is adjacent to the second major cutting edge 25 and is separated thereby from the first major cutting edge 23. Moreover, each minor cutting edge 27 is connected to the end cutting edge 21 of the adjacent cutting edge group. In other words, each minor cutting edge 27 connects the second major cutting edge 25 of one cutting edge group to the end cutting edge 21 of the adjacent cutting edge group.

Therefore, the height of the minor cutting edge 27 relative to the imaginary plane L increases moving away from the end connected to the second major cutting edge 25, and the other end of the minor cutting edge 27 is connected to the end cutting edge 21 of the adjacent cutting edge group and equal thereto in height relative to the imaginary plane L.

Furthermore, when viewed from the side, the angle of inclination $\theta 7$ (relative to the imaginary plane L) of an imaginary line that connects both ends of the minor cutting edge 27 is larger than the angle of inclination $\theta 5$ (relative to the imaginary plane L) of an imaginary line that connects both ends of the second major cutting edge 25. The value for the angle of inclination $\theta 7$ of the minor cutting edge 27 is not particularly limited but may be set to a value in the range of 7 to 15°, for example.

In the cutting insert 1 of the present embodiment, the second major cutting edge 25 is longer than the minor cutting edge 27. This makes it possible to further enhance the durability of the cutting insert 1.

The height of the second major cutting edge 25 relative to the imaginary plane L decreases moving towards the minor cutting edge 27. Likewise, the height of the minor cutting edge 27 relative to the imaginary plane L decreases moving towards the second major cutting edge 25. Therefore, when viewed from the side, a recess is formed at the boundary between the second major cutting edge 25 and the minor cutting edge 27. In cutting processes that employ the minor cutting edge 27 to achieve a greater cut depth, cutting stress may become concentrated at the boundary between the second major cutting edge 25 and the minor cutting edge 27. However, because the second major cutting edge 25 is longer than the minor cutting edge 27, a large range of cut depths can still be achieved in cutting processes that employ only the end cutting edge 21, the first major cutting edge 23, and the second major cutting edge 25 and do not employ the minor cutting edge 27.

Moreover, as illustrated in FIG. 4, when viewed from the side from a direction parallel to the end cutting edge 21, the first major cutting edge 23 and the second major cutting edge 25 each include a straight portion. Therefore, when the cutting insert 1 contacts the workpiece from a direction perpendicular to the end cutting edge 21 such as when the axial rake angle is 0°, the angles of inclination of the first major cutting edge 23 and the second major cutting edge 25 relative to the workpiece can remain constant when those cutting edges start cutting into the workpiece.

When using a circular arc-shaped cutting edge such as the one disclosed in Patent Document 1, the cutting ability of the cutting edge changes according to the orientation of the cutting edges relative to the workpiece and is therefore not uniform. As a result, the cutting process is prone to destabilization. Moreover, because the cutting ability of the cutting edge changes, the impact force applied to the cutting edge may also change according to the cutting conditions, such as when the cut depth is increased, for example. This may result in a decrease in the durability of the cutting insert. However, when the first major cutting edge 23 and the second major cutting edge 25 each include a straight portion, as described above, changes in cutting ability due to the orientation of each cutting edge relative to the workpiece can be kept small. This makes it possible to enhance the durability of the cutting insert 1.

Moreover, variations in the angles of inclination of the first major cutting edge 23 and the second major cutting edge 25 relative to the workpiece when those cutting edges start cutting into the workpiece can be kept small regardless of whether the axial rake angle is positive or negative. The cutting insert 1 therefore has good versatility across a wide variety of axial rake angles.

In the cutting insert 1 of the present embodiment, the cutting edge 9 is only formed along the edge where the top surface 3 and the side surface 7 meet, and the side surface 7 is slanted relative to the top surface 3 and the bottom surface 5. However, the present embodiment is not limited to such a configuration. The side surface 7 may be perpendicular to the top surface 3 and the bottom surface 5, and cutting edges 9 may be formed both along the edge where the top surface 3 and the side surface 7 meet and along the edge where the bottom surface 5 and the side surface 7 meet, for example. When the cutting insert 1 is configured such that a cutting edge 9 is also formed along the edge where the bottom surface 5 and the side surface 7 meet, the bottom surface 5 may also include a land face 13, a rake face 15, and a bottom face 17 like those of the top surface 3.

<Cutting Tool>

Next, a cutting tool 101 according to an embodiment of the present invention will be described with reference to figures.

Figure 12:
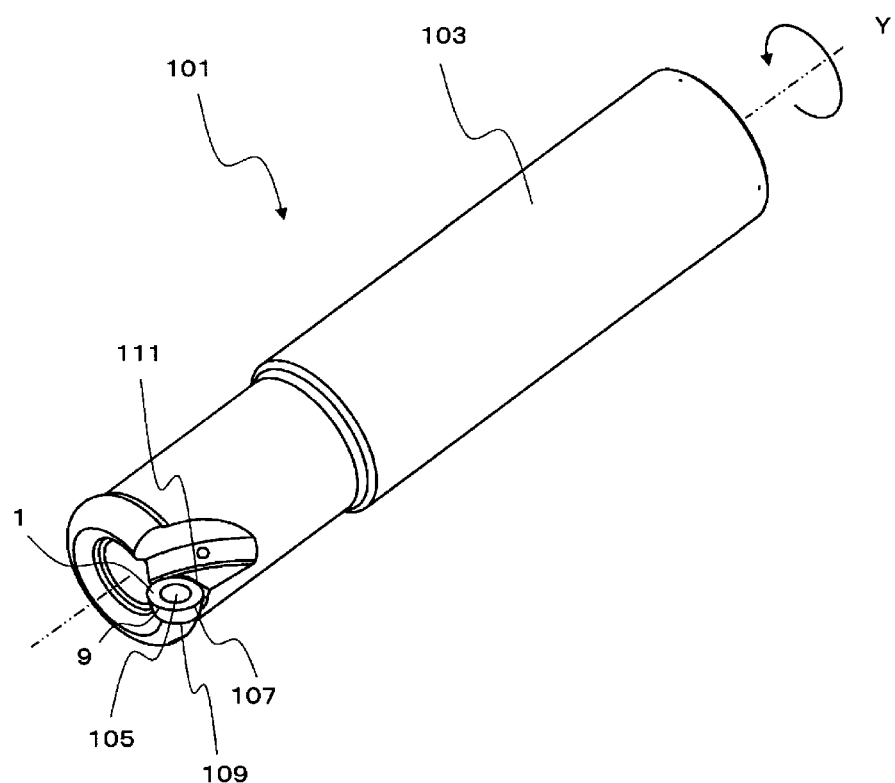
FIG. 12 is a perspective view of a cutting tool according to an embodiment of the present invention.

As illustrated in FIG. 12, the cutting tool 101 of the present embodiment includes a holder 103 having an insert pocket 107 formed in the end thereof and the above-described cutting insert 1, which is mounted within the insert pocket 107 such that the cutting edge 9 protrudes out from the end of the holder 103. The cutting insert 1 is mounted in the insert pocket 107 such that the end cutting edge is positioned at the endmost point.

The holder 103 has a long, thin rod shape. Furthermore, only a single insert pocket 107 is formed in the end of the holder 103. The insert pocket 107 provides a space in which the cutting insert 1 can be mounted and forms an opening in the end face and the side surface of the holder 103. Because the insert pocket 107 also forms an opening in the side surface of the holder 103, the cutting insert 1 can be mounted easily.

More specifically, the insert pocket 107 includes a seating face 109 parallel to the lengthwise direction of the holder 103 and a binding side face 111 that intersects with the seating face 109. The cutting insert 1 is mounted within the insert pocket 107. The cutting insert 1 is mounted such that one of the cutting edge groups thereof protrudes out from both the end and outer periphery of the holder 103.

The cutting tool 101 of the present embodiment includes only a single insert pocket 107 but may also be configured to include a plurality of insert pockets 107.

In the present embodiment, the cutting insert 1 is mounted to the holder 103 using a fixing screw 105. In other words, the fixing screw 105 is inserted through the through-hole of the cutting insert 1. The end of the fixing screw 105 is inserted into a screw hole formed in the insert pocket 107 and rotated such that the screw threads lock together, thereby fixing the cutting insert 1 to the holder 103.

A material such as steel or cast iron may be used for the holder 103. It is particularly preferable that high-toughness steel be used as the material for the holder 103.

<Method for Manufacturing Cut Product>

Next, a method for manufacturing a cut product according to an embodiment of the present invention will be described with reference to figures.

The cut product is manufactured by machining a workpiece 201. The method for manufacturing the cut product of the present embodiment includes the following steps:

(1) Rotating a cutting tool 101 representative of the embodiment described above.

(2) Bringing the cutting edge 9 of the rotating cutting tool 101 into contact with the workpiece 201.

(3) Moving the cutting tool 101 away from the workpiece 201.

Figure 13:
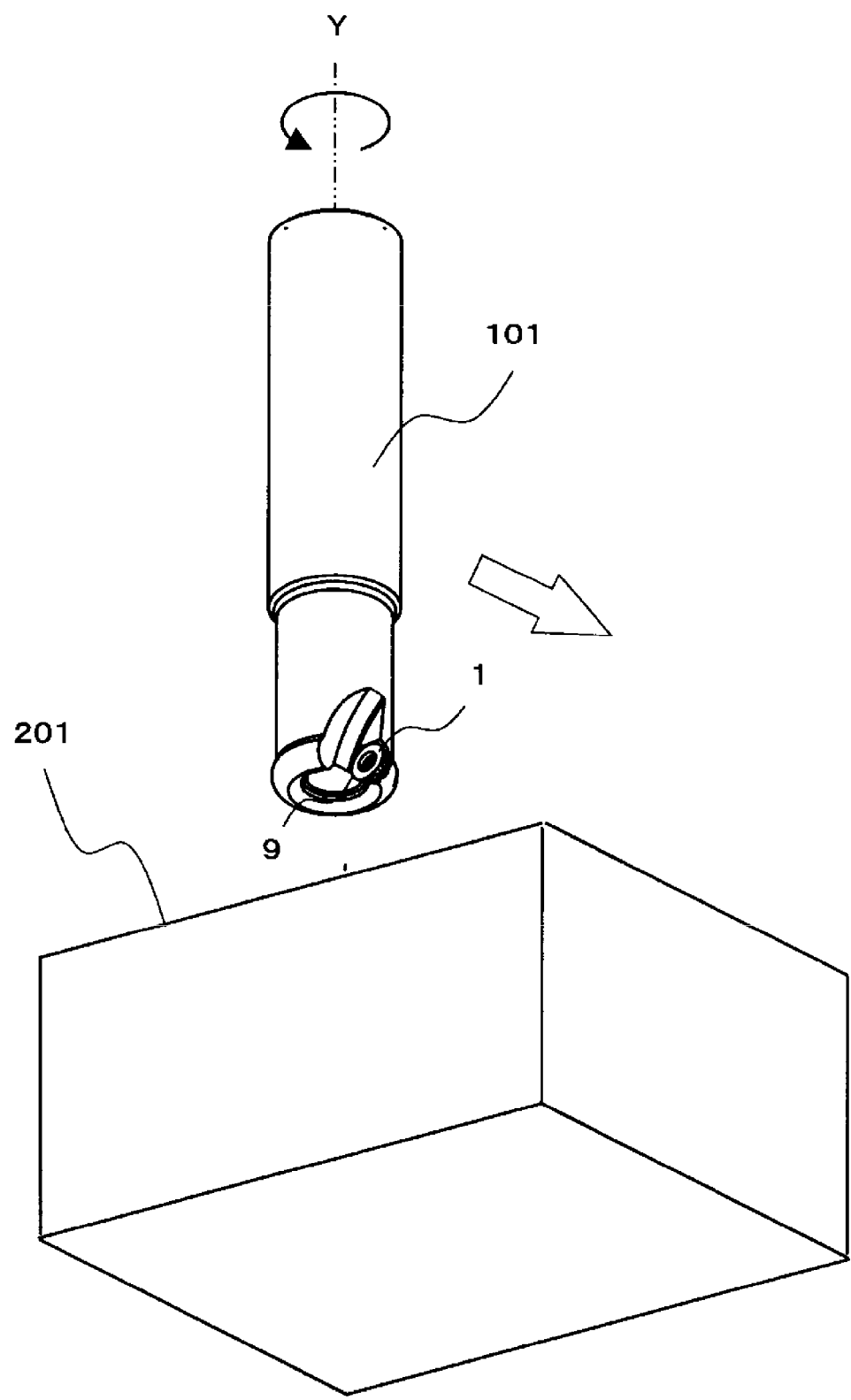
FIG. 13 is a perspective view illustrating a step in a method for manufacturing a cut product according to an embodiment of the present invention.
Figure 14:
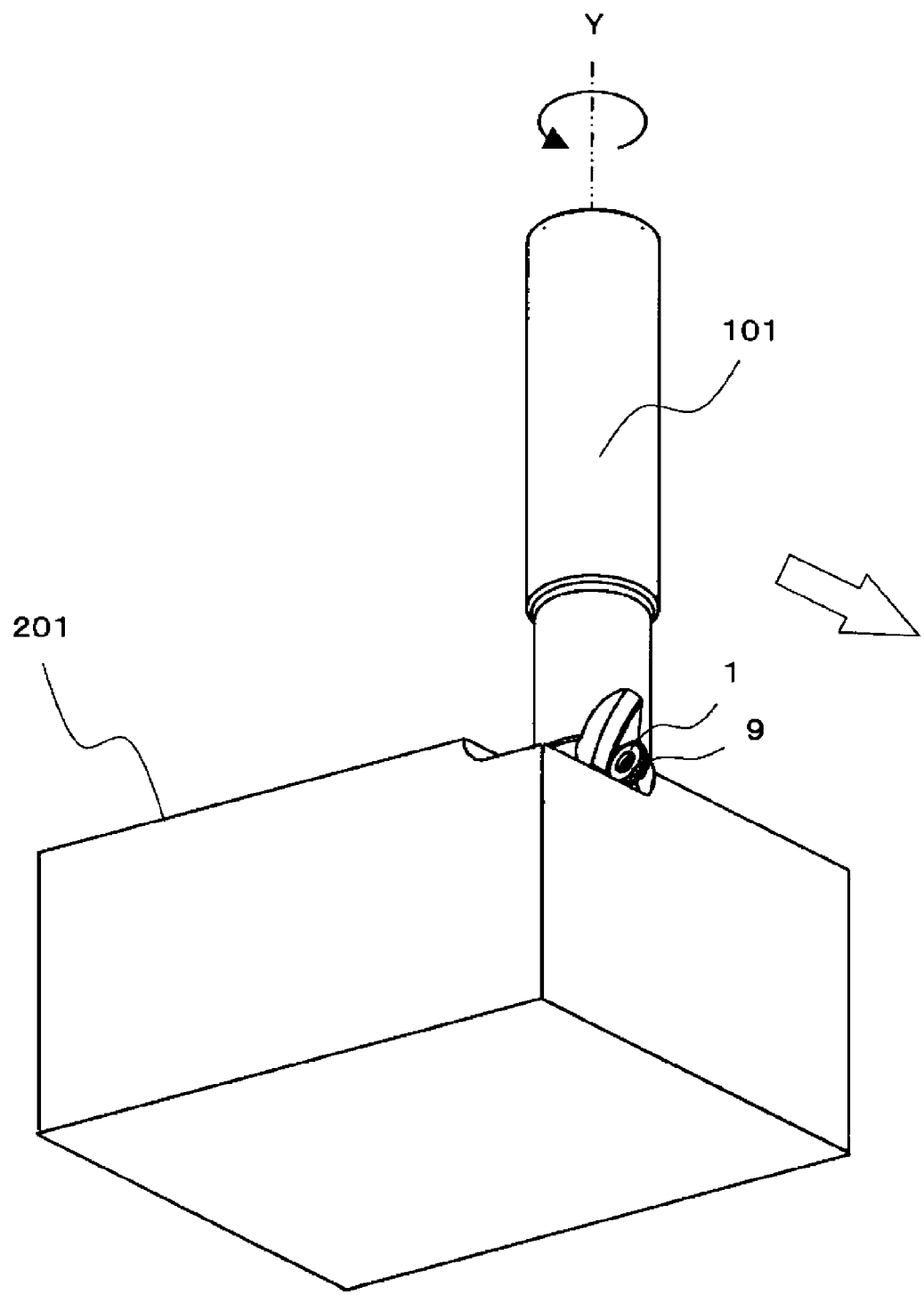
FIG. 14 is a perspective view illustrating another step in the method for manufacturing a cut product according to an embodiment of the present invention.
Figure 15:
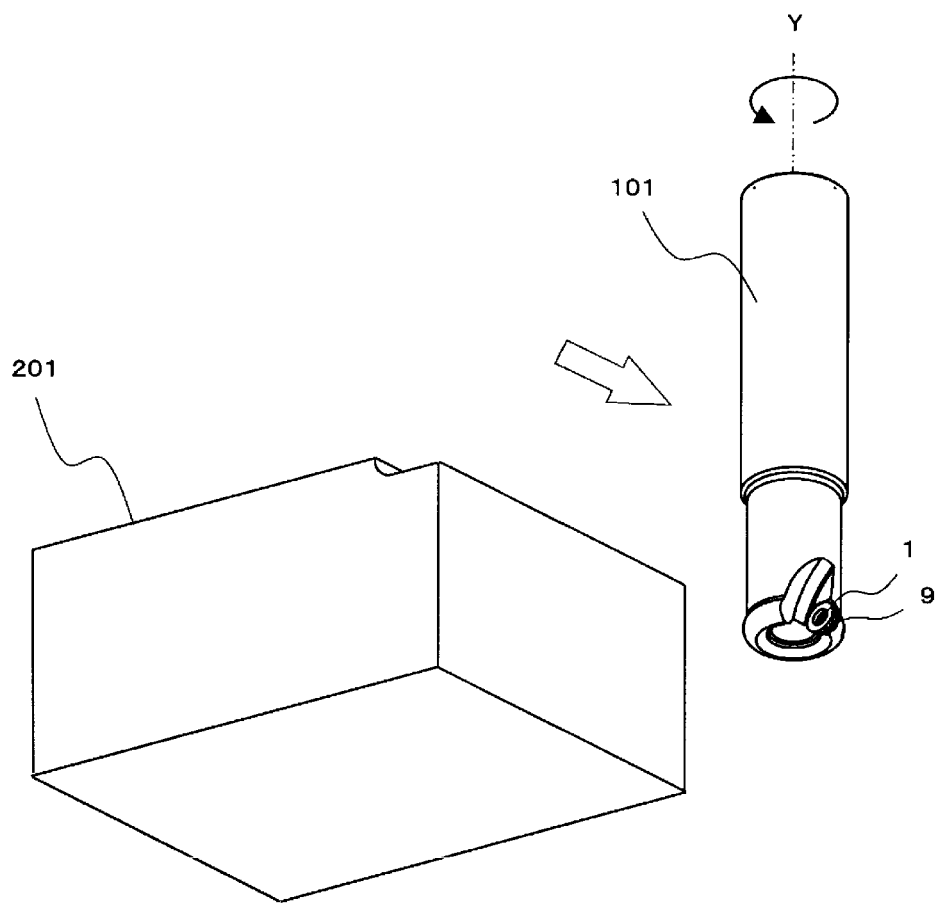
FIG. 15 is a perspective view illustrating another step in the method for manufacturing a cut product according to an embodiment of the present invention.
Figure 16:
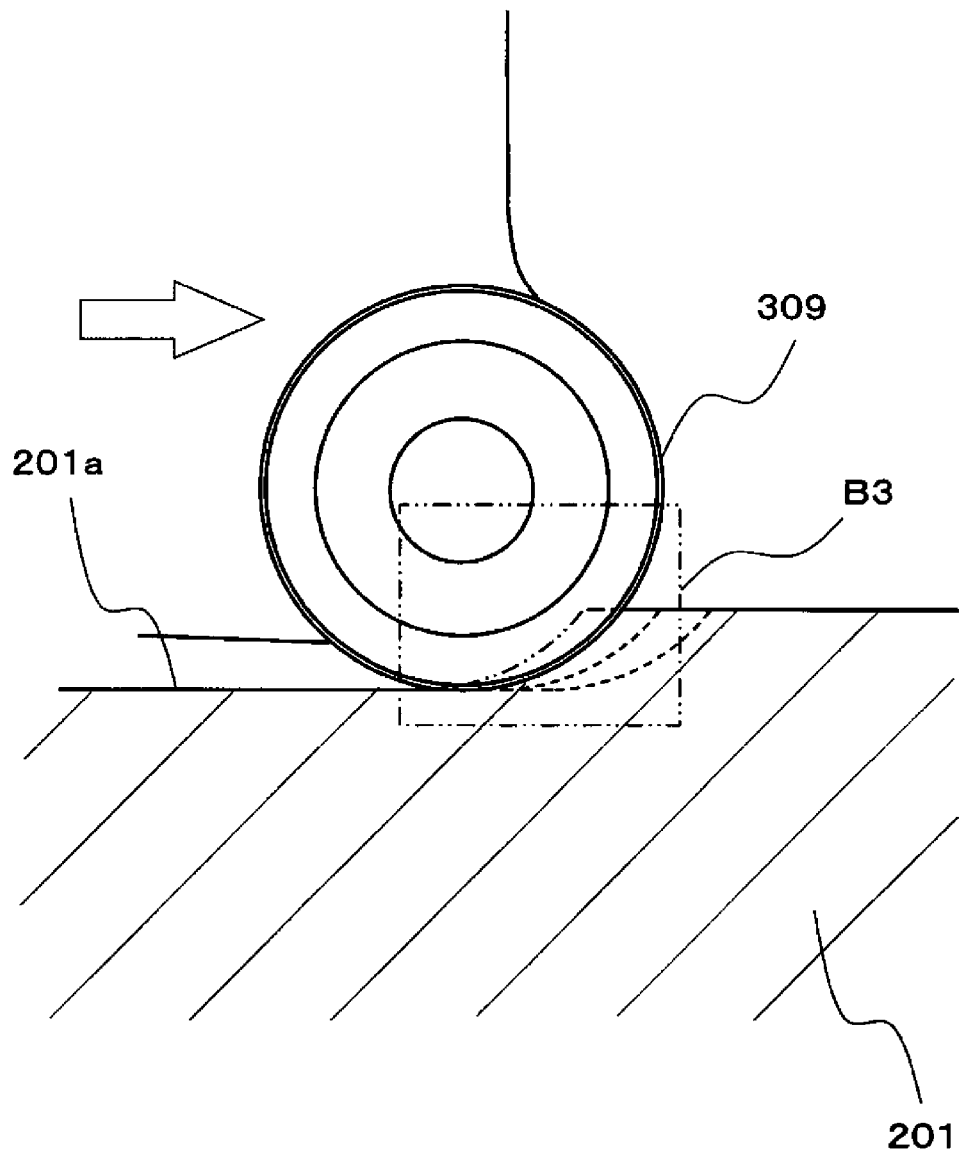
FIG. 16 schematically illustrates a cut product (workpiece) being cut.
Figure 17:
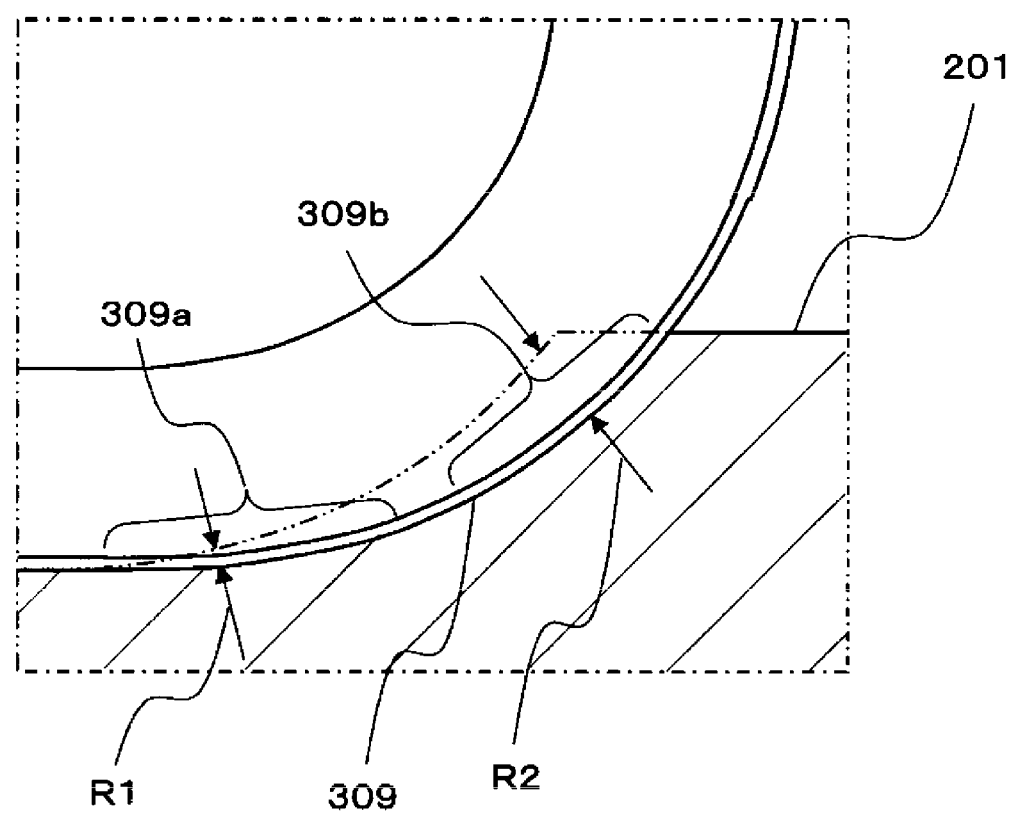
FIG. 17 is an enlarged view schematically illustrating region B3 illustrated in FIG. 16.

More specifically, as illustrated in FIG. 13, first the cutting tool 101 is rotated around the Y axis thereof and brought relatively close to the workpiece 201. Next, as illustrated in FIG. 14, the cutting edge 9 of the cutting tool 101 is brought into contact with the workpiece 201, thereby starting the cut on the workpiece 201. Then, as illustrated in FIG. 15, the cutting tool 101 is moved relatively far away from the workpiece 201.

In the present embodiment, the cutting tool 101 is brought near the workpiece 201 while the workpiece 201 is fixed and while the rotating cutting tool 101 is fixed in the Y axis direction. Moreover, in FIG. 14, the cutting edge 9 of the rotating cutting insert 1 contacts the workpiece 201, thereby cutting the workpiece 201. Furthermore, in FIG. 15, the still rotating cutting tool 101 is moved away from the workpiece 201.

During each step in the cutting process of the manufacturing method of the present embodiment, the cutting tool 101 is moved to either bring the cutting tool 101 into contact with the workpiece 201 or to move the cutting tool 101 through and out of the workpiece 201. However, the method for manufacturing a cut product of the present embodiment is not limited strictly to these actions.

For example, in step (1), the workpiece 201 can be brought near the cutting tool 101. Similarly, in step (3), the workpiece 201 can be moved away from the cutting tool 101. To continue the cutting process, the cutting tool 101 is kept in the rotating state, and the cutting edge 9 of the cutting insert 1 is brought into contact with another location on the workpiece 201. This process may be repeated as many times as necessary.

Moreover, representative examples of materials for the workpiece 201 include carbon steel, steel alloys, stainless steel, cast iron, and non-ferrous metals.

REFERENCE NUMBERS 1, 301 Cutting insert
3 Top surface
5 Bottom surface
7 Side surface
9, 309 Cutting edge
11 Through-hole
13 Land face
15 Rake face
17 Bottom face
19 Groove
21 End cutting edge
23 First major cutting edge
25 Second major cutting edge
27 Minor cutting edge 101 Cutting tool
103 Holder
105 Fixing screw
107 Insert pocket
109 Seating face
111 Binding face
201 workpiece

The invention claimed is:

1. A cutting insert, comprising:
a top surface;
a bottom surface;
a side surface disposed between the top surface and the bottom surface;
a cutting edge formed along an edge where the top surface and the side surface meet; and
a through-hole formed from a center portion of the top surface through a center portion of the bottom surface,
the cutting edge including in an order of an end cutting edge, a first major cutting edge and a second major cutting edge;
a height of the end cutting edge relative to an imaginary plane orthogonal to a central axis of the through-hole being fixed;
the first major cutting edge comprising a curved shape that protrudes outwards when viewed from directly above, and a height of the first major cutting edge relative to the imaginary plane increasing, when viewed from a side, moving away from an end of the first major cutting edge connected to the end cutting edge;
the second major cutting edge comprising a curved shape that protrudes outwards when viewed from directly above, and a height of the second major cutting edge relative to the imaginary plane decreasing, when viewed from a side, moving away from an end of the second major cutting edge connected to the first major cutting edge;
when viewed from a side, an angle of inclination of the second major cutting edge relative to the imaginary plane being greater at a center of the second major cutting edge than at either end thereof; and
when viewed from a side, an angle of inclination, relative to the imaginary plane, of an imaginary line connecting both ends of the second major cutting edge being greater than an angle of inclination, relative to the imaginary plane, of an imaginary line connecting both ends of the first major cutting edge.

2. The cutting insert according to claim 1,
wherein the cutting edge further comprises a minor cutting edge disposed adjacent to the second major cutting edge and on an opposite side from the first major cutting edge,
wherein at an other end of the second major cutting edge connected to the minor cutting edge, the height of the second major cutting edge relative to the imaginary plane being smaller than a height of the end cutting edge relative to the imaginary plane; and
a height of the minor cutting edge relative to the imaginary plane increases moving away from an end of the minor cutting edge connected to the second major cutting edge, and at an other end of the minor cutting edge, the height of the minor cutting edge relative to the imaginary plane is equal to the height of the end cutting edge relative to the imaginary plane.

3. The cutting insert according to claim 2, wherein when viewed from a side, an angle of inclination, relative to the imaginary plane, of an imaginary line connecting both ends of the minor cutting edge is greater than the angle of inclination, relative to the imaginary plane, of the imaginary line connecting both ends of the second major cutting edge.

4. The cutting insert according to claim 3, wherein the second major cutting edge is longer than the minor cutting edge.

5. The cutting insert according to claim 1, wherein the second major cutting edge is longer than the first major cutting edge.

6. The cutting insert according to claim 1, wherein when viewed from a side from a direction parallel to the end cutting edge, the first major cutting edge and the second major cutting edge each comprise a straight portion.

7. The cutting insert according to claim 1,
wherein the top surface comprises a land face disposed around an outer periphery of the top surface and connected to the cutting edge, and a rake face that is surrounded by the land face and that decreases in height moving towards a center of the top surface, and
wherein a rake angle of the rake face in a region corresponding to the end cutting edge, a rake angle of the rake face in a region corresponding to the first major cutting edge, a rake angle of the rake face in a region corresponding to the second major cutting edge, and a rake angle of the rake face in a region corresponding to a minor cutting edge are all equal.

8. A cutting tool, comprising:
a holder comprising an insert pocket formed in an end thereof; and
the cutting insert described in claim 1 mounted in the insert pocket such that the cutting edge of the cutting insert protrudes from the holder.

9. A method for manufacturing a cut product, comprising the steps of:
rotating the cutting tool described in claim 8;
bringing the cutting edge of the rotating cutting tool into contact with a workpiece; and
moving the cutting tool away from the workpiece.

* * * * *